United States Patent [19]

Welch

[11] Patent Number: 5,009,052
[45] Date of Patent: Apr. 23, 1991

[54] METHOD AND APPARATUS FOR CONSTRUCTION OF GRAIN BINS

[75] Inventor: Herbert T. Welch, Calgary, Canada
[73] Assignee: John P. Welch, Alberta, Canada
[21] Appl. No.: 394,121
[22] Filed: Aug. 15, 1989
[51] Int. Cl.$^5$ .............................................. E04B 1/00
[52] U.S. Cl. ...................................... 52/742; 52/247; 52/365
[58] Field of Search ............... 52/247, 293, 365, 285, 52/742, 192

[56] References Cited

U.S. PATENT DOCUMENTS

| | | | |
|---|---|---|---|
| 1,265,966 | 5/1918 | Schlafly | 52/245 |
| 3,031,801 | 5/1962 | Leuthesser | 52/742 |
| 3,281,999 | 11/1966 | Keely | 52/247 X |
| 3,397,494 | 8/1968 | Waring | 52/293 X |
| 3,574,984 | 4/1971 | Chap | 52/293 X |
| 3,685,232 | 8/1972 | Steffen | 52/742 |
| 4,287,691 | 9/1981 | Guenther | 52/247 X |

Primary Examiner—David A. Scherbel
Assistant Examiner—Lan Mai
Attorney, Agent, or Firm—Irell & Manella

[57] ABSTRACT

A circular base form is constructed from curved lengths of corugated steel bolted together and has apertured vertical brackets secured to the inside of the base form at spaced intervals around the inside of the form. Vertical anchor pins slide within the apertures of the brackets and are driven into the ground once the circular base form is positioned correctly. The upper edge of the base form is outwardly flanged horizontally and is successively leveled by transit or the like. As the sections are leveled, they are secured to the ground engaged anchor pins by ring bolts or the like until the entire form is leveled. Gravel and concrete is then poured into the form, preferably with reinforcing bars, mesh or the like and leveled flush with the top flange by means of screeding. When set, the lowermost wall section, the roof and then succeeding sections of the bin are assembled on the top flange of the base and are raised when each section is completed be means of a crane, hoist or the like. The lowermost wall section of the bin is provided with an out-turned horizontal base flange which engages upon caulking placed on the base wall flange and then the two flanges are bolted together thus completing the bin.

18 Claims, 3 Drawing Sheets

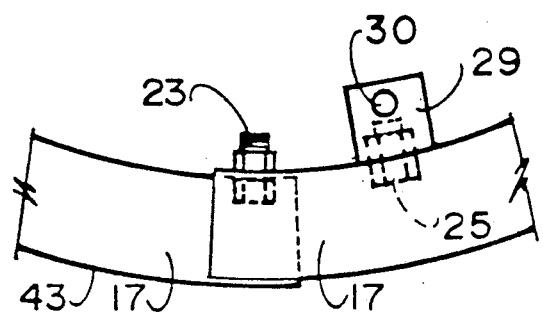
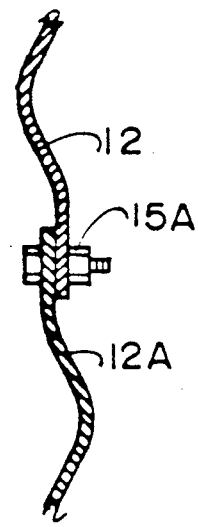
FIG. 6
FIG. 7
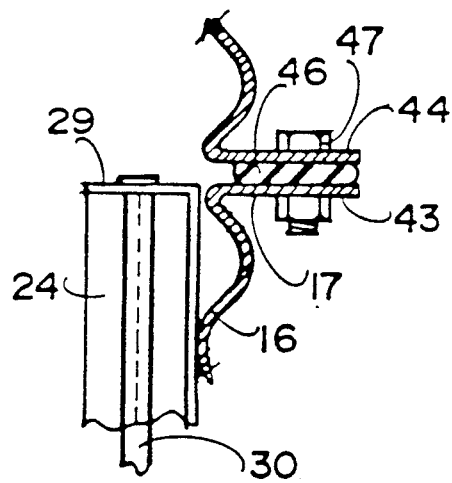
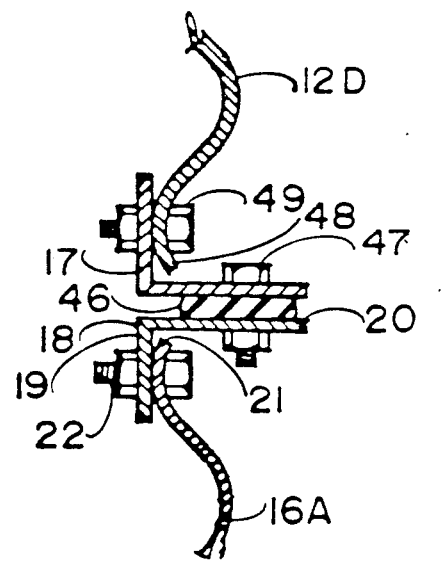
FIG. 8
FIG. 9

METHOD AND APPARATUS FOR CONSTRUCTION OF GRAIN BINS

This invention relates to new and useful improvements in the construction of grain bins, particularly cylindrical grain bins formed from horizontally corrugated steel plates. The invention relates to a method of construction and apparatus for erecting said grain bins and in particular relates to the provision of a circular concrete base formed within the base wall section of the grain bin prior to erection of the remainder of the bin in order to ensure a level support for the bin, means to provide a smooth concrete floor surface within the bin and means to facilitate the erection of the bin upon the base once the concrete is set.

Conventionally, grain bins are constructed in a variety of ways. A wood floor may be provided upon skids whereupon the metal grain bin is erected thereon. Wood floors and skids rot readily and often subside due to ground conditions, moisture and the like and are also difficult to seal at the base in order to prevent moisture from entering between the bin and the floor thus providing conditions for grain spoilage.

Another method is to pour a concrete pad upon the ground prior to erecting the grain bin thereon. This is difficult to level, particularly the upper surface thereof as if the wood forms for the concrete base are not perfectly leveled prior to pouring, leveling of the surface is difficult if not impossible and if the surface is not smooth, clean out of grain is time consuming. Furthermore, once again it is difficult to seal the base of the bin relative to the concrete in order to prevent the ingress of moisture particularly caused by snow melt and the like.

A third method commonly in use is to provide a form and place spacers such as bricks or the like within the form upon which the grain bin is erected.

Concrete is then poured around the outside of the bin and upon the inside thereof but of course it will be appreciated that it is almost impossible to level and smooth the inside surface of the floor because there are no reference points upon which to support screeding boards so that the operator is forced to enter the bin and attempt to float the concrete as level as possible often under conditions of poor light, lack of reference points and lack of screed board supports. Once again it is difficult to prevent the ingress of moisture between the bin and the floor unless the level of the floor is raised substantially above the level of the concrete surrounding the outside of the bin. Once again this is sometimes difficult to accomplish.

The present method and construction overcomes these difficulties by providing a stable concrete floor utilizing the base wall section of the bin as the form and because it includes an out-turned flange on the upper side of the base wall form, it is extremely easy to screed the concrete flat and level with the screeding board engaging the upper horizontal flange of the base wall form.

In accordance with the invention there is provided a method for constructing grain bins comprising the steps of:

(a) securing together a plurality of base wall segments to form a circular base wall on the ground, said base wall having an out-turned flange around the upper edge thereof;

(b) positioning said wall equidistantly around a bin centre point and anchoring said base wall to the ground by means of a plurality of ground engaging pins, (c) horizontally leveling said upper flange of said base wall by adjusting said base wall vertically relative to each of said pins, (d) securing said base wall to said pins in said level position, (e) pouring gravel and then concrete into said base wall and leveling the upper surface of the concrete by screeding same level with said upper flange and, (f) then erecting the grain bin upon said base wall.

Another aspect of the invention is to provide, in a grain bin construction which includes a roof section and a plurality of substantially circular wall sections, the improvement comprising a substantially circular base wall section, said base wall section including a plurality of segments secured together to form said base wall section, an outwardly extending, substantially horizontal annular flange on the upper edge of said base wall section, a plurality of substantially equidistantly spaced pin retaining and supporting brackets secured to the inside surface of said base wall, said brackets including spaced and parallel horizontally situated apertured flanges, a ground engaging pin for each bracket slideably engaging through said flanges and supported substantially vertically therein and clamp means cooperating between said pins and a portion of said base wall section immediately adjacent said pins, whereby said base wall can be adjusted vertically with respect to said pins.

Another advantage of the invention is the relative ease of assembling the base wall section or form and centering same around a central point and then adjusting the level of the upper flange of the form and clamping it into position upon ground engaging pins thus stabilizing the form prior to the pouring of gravel and concrete therein.

Another advantage of the invention is the facility with which a grain bin can be erected upon the base after the concrete has set.

A still further advantage of the invention i the ease within which moisture can be excluded from the interior of the bin once erected.

Still another advantage of the invention is the ease with which air ducts, clean out auger tubes, and the like may be incorporated within the concrete floor prior to pouring same. With the use of air ducts, aeration of the grain contents from the outside of the bin is relatively easy and if a discharge auger tube is included, then discharge of the grain from the bin can be accomplished without the necessity of opening the bin until final clean out is required.

Another advantage of the invention is to provide a method and device of the character herewithin described which is simple in construction, economical in operation and well suited to the purpose of which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

DESCRIPTION OF THE DRAWINGS

FIG. 6 is a fragmentary top plan view of a junction between adjacent segments of the base wall form.

FIG. 7 is a fragmentary cross sectional view substantially along the line 7—7 of FIG. 1.

FIG. 8 is a fragmentary vertical cross sectional view substantially along the line 8—8 of FIG. 1.

FIG. 9 is a view similar to FIG. 8 but showing an alternative method of construction of the components thereof but with the pin support bracket removed for clarity.

In the drawings like characters of reference indicate corresponding parts in the different figures.

DETAILED DESCRIPTION

Figure 1:
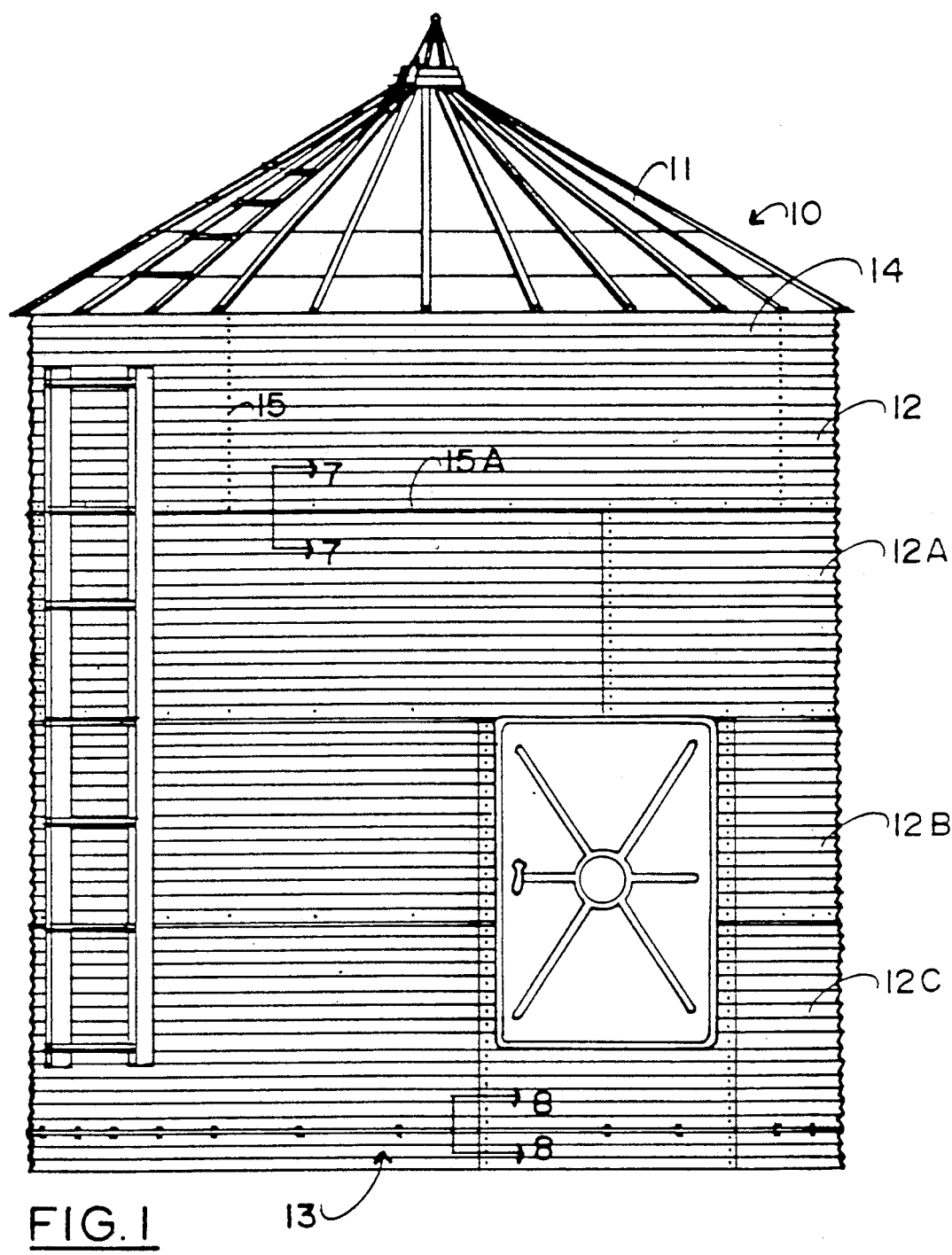
FIG. 1 is a front elevation of a grain bin constructed according to the present invention.

Proceeding therefore to describe the invention in detail, reference should first be made to FIG. 1 which shows a grain bin collectively designated 10 including a roof assembly 11, vertical wall sections 12, 12A, 12B and 12C mounted upon a base wall section collectively designated 13.

The wall sections and the base section are preferably made from horizontally corrugated steel segments one of which is shown in the upper wall section 12 and identified by reference character 14. These segments are bolted together in overlapping vertical relationship and secured by mean of bolts or rivets indicated by reference character 15.

Adjacent wall sections 12, 12A, etc. are in turn bolted circumferentially in downwardly extending overlapping relationship as shown in FIG. 7 and are secured together by a ring of horizontal bolts, rivets or the like 15A.

Figure 4:
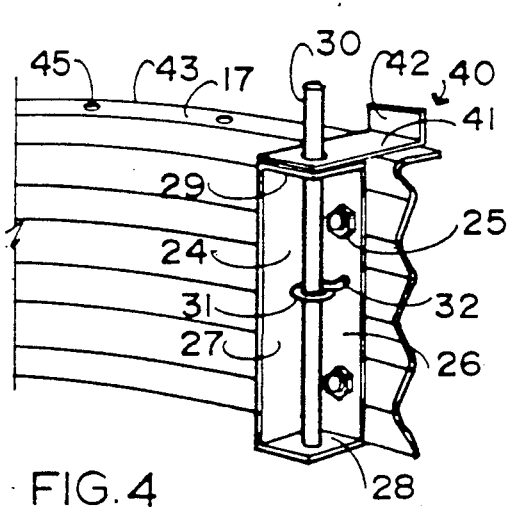
FIG. 4 is an enlarged fragmentary isometric view of the end of one wall section of the base wall form.

The base wall section or form 13 is also formed from curved segments of horizontally corrugated metal specifically identified by reference character 16 and these are formed with an upper out-turned horizontal annular flange 17 preferably formed integrally with the vertical section 16 as illustrated in FIGS. 4 and 8.

However, if desired, this horizontal annular flange 17 may take the form of a right angled member 18 shown in FIG. 9 which includes a vertical portion 19 and a horizontal portion 20. The vertical portion is bolted or otherwise secured adjacent the upper edge 21 of the corrugated wall 16A by means of bolts or rivets 22 with the horizontal flange 20 extending outwardly as shown and corresponding to the horizontal flange 17, which is the preferred construction, and which is shown in FIGS. 4 and 8

The individual segments of the base wall section or form are joined together to form a circle with the ends overlapping and being secured together by bolts, rivets or the like 23 as shown in FIG. 6 with the horizontal flanges 17 also overlapping at these points of connection.

Once the ring is formed, it must be positioned upon the ground and formed into a relatively perfect circle prior to the pouring of concrete. It is also necessary to level the form, so that the floor can be provided with a level flat surface by screeding as will hereinafter be described.

Figure 5:
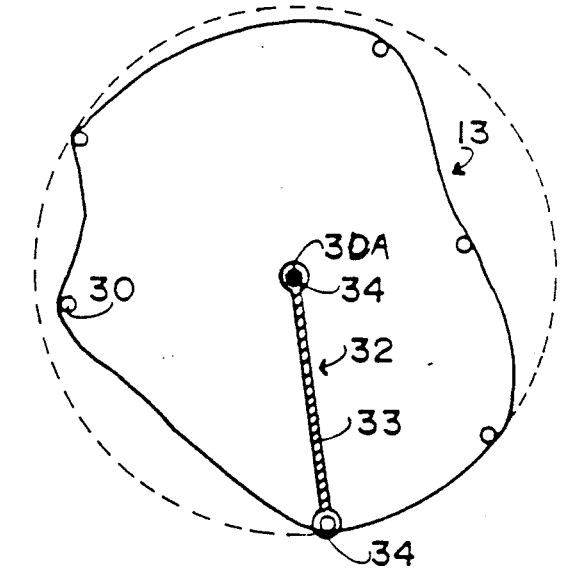
FIG. 5 is a schematic top plan view of the base wall form showing the centering and anchoring sequence.

Dealing first with the method of centering and forming the circle defined by the base wall section, reference should be made to FIGS. 4 and 5.

A plurality of vertically situated pin retaining and support brackets 24 are bolted to the inside of the base wall section or form by means of bolts 25.

These are spaced, preferably equidistantly, around the inside of the base wall form and include the vertical attaching web 26, together with a right angulated web 27 and having a lower apertured flange 28 spanning the bases of these webs and an upper horizontal apertured flange 29 spanning the upper ends of the webs 26 and 27 as clearly shown in FIG. 4.

A ground engaging pin 30 extends freely through aperture within flanges 28 and 29 and through a ring or hook head 31 of a securing bolt 32. This bolt extends through an aperture within the web 26 and the vertical wall of the segment 16 immediately therebehind and is secured loosely by means of a nut (not illustrated).

Pins 30 are loosely inserted within the flanges 28 and 29 of the brackets 24 and a central pin 30A is driven into the ground in the desired centre of the finished floor and extends vertically upwardly therefrom and within the confines of the base wall form 13.

Radius means collectively designated 32 are provided and in the preferred embodiment take the form of a flexible steel cable 33 having eyes or loops 34 formed a each end with the effective length of the cable and eyes being substantially equal to the radius of the finished floor assembly.

The cable is engaged by one eye 34 over the central pin 30A and is extended fully and engaged over one of the pins 30 with the operator moving the wall outwardly until the cable is taut whereupon the pin may be driven temporarily into the ground.

This process is repeated with most or all of the pins 30 until the form is in a relatively perfect circle extending around the centre point defined by pin 30A whereupon the pins 30 are pounded into the ground to stabilize the base wall form.

The upper flange 17 of the base wall form is then leveled successively by transit and by raising or lowering the wall form at that point whereupon the ring bolts 31 are tightened thus clamping the portion of the form to that particular pin 30.

This is continued until the flange 17 is leveled horizontally and the bolts 31 are fully tightened.

Figure 3:
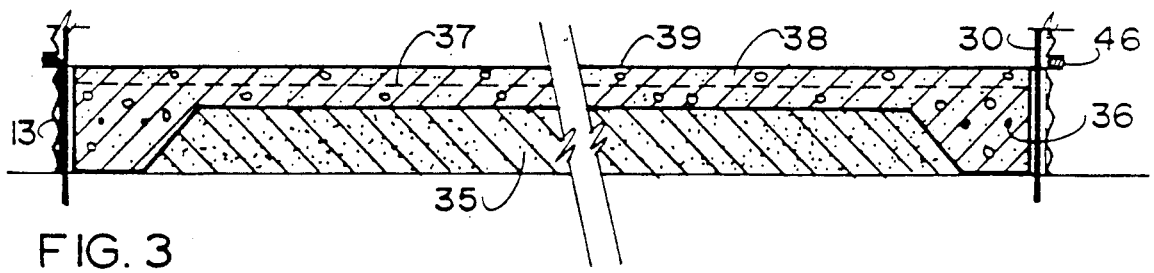
FIG. 3 is a diametric section of FIG. 2.

Gravel 35 is then poured in the centre of the base wall form (see FIG. 3), and compacted, and reinforcing rods 36 and wire mesh 37 are placed in position if such reinforcing is desired.

Figure 2:
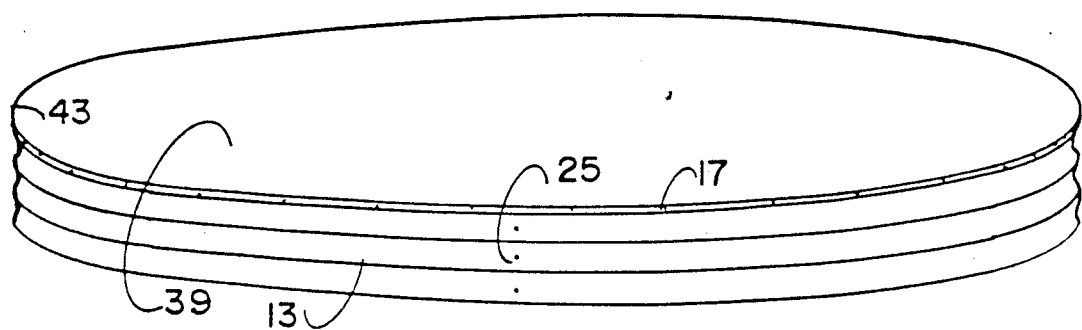
FIG. 2 is a raised front elevation of the base wall form with the floor poured therein.

Concrete 38 is then poured over the gravel and within the form and a conventional screeding member (not illustrated) spans the horizontal flange 17 and the surface 39 of the floor 38 is smoothed and leveled as shown in FIG. 2.

When the concrete is hardened, detachable right angulated retainer plates collectively designated 40 are engaged over the upper end portions of the pins 30 which extend above the upper flanges 29 of the brackets 24. These retainer plates include an apertured horizontal portion 41 which engages the pins 30 and rests upon the upper flanges 29 of the brackets 24 and upon the out turned horizontal flange 17 as clearly shown in FIG. 4. A vertical right angled portion 42 extends upwardly from the outer end of the horizontal portion 41 and is substantially flush with the outermost edge 43 of the flange 17.

These retainer plates 40 are used during the assembly of the wall portions 12, 12A, etc. As the wall segments are bolted together, the vertical portion 42 of the retainer plates 40 not only position the bases of the sections correctly but prevent them from moving outwardly and disengaging over the outer edge 43 of the flange 17.

The retainer plates 40 are particularly useful in the assembly of the cylindrical sections 12, 12A, 12B, etc. which are assembled as follows:

Firstly the uppermost wall section 12 is assembled on the flange 17 retained and positioned by the plates 40 and bolted together by means of bolts 15 as hereinbefore described.

The roof section is then assembled onto the upper side of the wall section 12, overlapping the upper edge of section 12 and bolted thereto whereupon the roof and this section 12 together with the roof section, is elevated by means of a crane, hoist or the like (not illustrated) sufficiently high to enable the next section 12A to be assembled on the flange 17.

This continues until the roof, sections 12, 12A and 12B are assembled and elevated whereupon the lowermost section 12C is then assembled on the flange 17. This particular section differs slightly from sections 12, 12A and 12B inasmuch as the lower edge is also provided with an out turned horizontally extending annular flange 44 as shown in FIG. 8.

This flange corresponds to flange 17 both of which are apertured as indicated in FIG. 4 by reference character 45.

Once the lowermost section 12C has been assembled, the already assembled portion of the bin in lowered downwardly in overlapping relationship and secured by means of bolts 15A whereupon the entire grain bin is raised again consisting of the roof, and sections 12 through 12C.

The retainer plates 40, which have assisted in the assembly of all of the sections by retaining same upon flange 17, may then be removed and discarded whereupon the portions of the pins 30 extending above the upper flange 29 of the bracket 24 are cut off as by a torch or mechanical means, substantially flush with the upper side of bracket 29.

Caulking strips 46 are then placed upon the upper surface of flange 17 whereupon the hoisted portion of the grain bin assembly is lowered downwardly so that flanges 44 and 43 align with the apertures 45 also being aligned whereupon nut and bolt assemblies 47 may be engaged through the apertures in the mating flanges and clamped together thus clamping the remainder of the grain bin assembly to the base wall form 13 in sealing relationship. It will be noted that this particular seal is spaced well above the ground level so that the ingress of moisture through this junction is, for all intents and purposes, eliminated.

In the preferred embodiment illustrated in FIGS. 1 through 8, the base wall form segments 16 are preferably formed from segments which ar utilized to make up the lowermost wall section 12C, by cutting off the upper sides of these segments so that the height is equivalent to the desired base wall section or form height. These segments are then turned upside down and bolted together to form the wall 13. If the construction of the lowermost wall portion of the grain bin is as illustrated in FIG. 9 and identified by reference character 12D, then this also can be utilized in forming corresponding base wall form segments 16. In this particular configuration, right angled brackets 47 are bolted to the lower edge 48 of the section 12D by means of bolts 49 and these can be utilized to form the base wall form segments 16A in a similar manner to the preferred embodiment.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method of constructing grain bins comprising the steps of:
    (a) securing together a plurality of base wall segments to form a circular base wall section on the ground, said base wall section having an out-turned horizontal annular flange around the upper edge thereof;
    (b) engaging a centre pin with the ground and extending upwardly perpendicularly therefrom within the confines of said circular base wall section,
    (c) engaging a plurality of said ground engaging pins perpendicularly through pin retaining and supporting brackets extending inwardly from said segments with the upper ends of said pins extending above said brackets but not penetrating the ground surface, said pins being situated substantially equidistantly around said base wall,
    (d) extending a radius member between said centre pin and, successively, several of said pins extending perpendicularly through said brackets and then adjusting the position of said base wall section until it is substantially circular and the circumference is substantially equidistantly situated from said centre pin,
    (e) engaging said pins in said brackets, with the ground to anchor said base wall section in position,
    (f) horizontally levelling said out-turned flange of said base wall section by adjusting said base wall section vertically relative to each of said pins,
    (g) securing said base wall section to said pins in said level,
    (h) pouring gravel and then concrete into said base wall section and levelling the upper surface of the concrete by screeding same substantially level with said out-turned flange and,
    (i) then erecting the grain bin upon said base wall.

2. The method according to claim 1 in which step (f) includes the further steps of:
    (a) securing a roof section to a plurality of circular wall sections including a lowermost wall section having an out-turned horizontal annular flange on the lower side edge thereof.

3. A method of constructing a grain bin comprising the steps of:
    (a) securing together a plurality of base wall segments to form a circular base wall section on the ground, said base wall section having an out-turned horizontal annular flange around the upper edge thereof;
    (b) positioning said wall equidistantly around a bin centre point and anchoring said base wall section to the ground by means of a plurality of ground engaging pins, said ground engaging pins extending above the level of said out-turned flange of said base wall section, (c) horizontally leveling said out-turned flange of said base wall section by adjusting said base wall section vertically relative to each of said pins, (d) securing said base wall section to said pins in said level position, (e) pouring gravel and then concrete into said base wall section and leveling the upper surface of the concrete by screeding same substantially level with said out-turned flange, (f) engaging a right-angled retainer plate over each pin, said plate including a horizontal portion resting on said out-turned flange and a vertical portion extending upwardly from the outer edge of said out-turned flange, (g) securing a roof section to a plurality of circular wall sections including a lowermost wall section having an out-turned horizontal annular flange on the lower side edge thereof, (h) applying caulking between said out-turned flange on said base wall section and said out-turned flange on said lowermost wall section and engaging said flanges together, said retainer plates retaining said lowermost wall sections in position, (i) securing said flanges together in clamping sealed relationship, (j) removing said retainer plates, and said grain bin is erected, and (k) removing the portions of said pins extending above the level of said concrete.

4. The method according to claim 3 in which step (b) includes the further steps of:

(a) engaging a centre pin with the ground and extending upwardly perpendicularly therefrom within the confines of said circular base wall section, (b) engaging a plurality of said ground engaging pins perpendicularly through pin retaining and supporting brackets extending inwardly from said segments with the upper ends of said pins extending above said brackets but not penetrating the ground's surface, said pins being situated substantially equidistantly around said base wall, (c) extending a radius member between said centre pin and, successively, several of said pins extending perpendicularly through said brackets and then adjusting the position of said base wall section until it is substantially circular and the circumference is substantially equidistantly situated from said centre pin and then, (d) engaging said pins in said brackets, with the ground to anchor said base wall section in position.

5. In a grain bin construction which includes a roof section and a plurality of substantially circular wall sections, the improvement comprising a substantially circular base wall section, said base wall section including a plurality of segments secured together to form said base wall section, an outwardly extending, substantially horizontal annular flange on the upper edge of said base wall section, a plurality of substantially equidistantly spaced pin retaining and supporting brackets secured to the inside surface of said base wall, said brackets including spaced and parallel horizontally situated apertured flanges, a ground engaging pin for each bracket slideably engaging through said flanges and supported substantially vertically therein and clamp means cooperating between said pins and a portion of said base wall section immediately adjacent said pins, whereby said base wall can be adjusted vertically with respect to said pins. , 6. The grain bin construction according to claim 5 in which said clamp means includes a bolt having a pin engaging head portion, extending through said base wall section adjacent said pins with said pin engaging head freely engaging upon said pins, and clamp means cooperating with said bolts on the outside of said base wall section to detachably clamp said section to said pins.

7. The grain bin construction according to claim 6 which include right-angulated retainer plates having a vertical portion and an apertured horizontal portion, detachably engaged by said apertured horizontal portion, over the upper ends of said pins and resting upon said upper flange of said bracket with the vertical portion of said retainer plate being substantially flush with the outer boundary of said out-turned horizontal flange of said base wall section to position and retain the sections of said bin upon said base wall section during assembly and erection thereof.

8. The grain bin construction according to claim 7 in which said bin construction includes a lowermost wall section, said section having an out-turned, substantially horizontal, annular flange on the lower edge of said base wall section, engagable upon said annular flange of said base wall section and means to clamp said flanges together in sealing relationship.

9. The grain bin construction according to claim 6 in which said bolts engage said pins between said flanges of said brackets.

10. The grain bin construction according to claim 9 which include right-angulated retainer plates having a vertical portion and an apertured horizontal portion, detachably engaged by said apertured horizontal portion, over the upper ends of said pins and resting upon said upper flange of said bracket with the vertical portion of said retainer plate being substantially flush with the outer boundary of said out-turned horizontal flange of said base wall section to position and retain the sections of said bin upon said base wall section during assembly and erection thereof.

11. The grain bin construction according to claim 10 in which said bin construction includes a lower-most wall section, said section having an out-turned, substantially horizontal, annular flange on the lower edge of said base wall section, engagable upon said annular flange of said base wall section and means to clamp said flanges together in sealing relationship.

12. The grain bin construction according to claim 9 in which said bin construction includes a lowermost wall section, said section having an out-turned, substantially horizontal, annular flange on the lower edge of said base wall section, engagable upon said annular flange of said base wall section and means to clamp said flanges together in sealing relationship.

13. The grain bin construction according to claim 5 which include right-angulated retainer plates having a vertical portion and an apertured horizontal portion, detachably engaged by said apertured horizontal portion, over the upper ends of said pins and resting upon said upper flange of said bracket with the vertical portion of said retainer plate being substantially flush with the outer boundary of said out-turned horizontal flange of said base wall section to position and retain the sections of said bin upon said base wall section during assembly and erection thereof.

14. The grain bin construction according to claim 13 in which said bin construction includes a lowermost wall section, said section having an out-turned, substantially horizontal, annular flange on the lower edge of said base wall section, engagable upon said annular flange of said base wall section and means to clamp said flanges together in sealing relationship.

15. The grain bin construction according to claim 5 in which said bin construction includes a lowermost wall section, said section having an out-turned, substantially horizontal, annular flange on the lower edge of said base wall section, engagable upon said annular flange of said base wall section and means to clamp said flanges together in sealing relationship.

16. The grain bin construction according to claim 6 in which said bin construction includes a lowermost wall section, said section having an out-turned, substantially horizontal, annular flange on the lower edge of said base wall section, engagable upon said annular flange of said base wall section and means to clamp said flanges together in sealing relationship.

17. The grain bin construction according to claim 5 in which said out turned annular flange on the upper side of base wall section is formed integrally therewith.

18. The grain bin construction according to claim 5 in which said out-turned extending annular flange on the upper edge of said base wall section comprises a right-angulated bracket having a vertical portion and a horizontal portion secured to the upper edge of said base wall section by said vertical portion with said horizontal portion extending outwardly therefrom to form said out-turned horizontal flange of said base wall section.

* * * * *